(12) United States Patent
Castillo et al.

(10) Patent No.: US 10,830,251 B2
(45) Date of Patent: Nov. 10, 2020

(54) FLUID PUMP

(71) Applicant: DELPHI TECHNOLOGIES IP LIMITED, St. Michael (BB)

(72) Inventors: Jesus J. Castillo, Chihuahua (MX); Alma L. Leanos, Chihuahua (MX); Arturo Gutierrez, Chihuahua (MX); Martin Santos, Chihuahua (MX)

(73) Assignee: DELPHI TECHNOLOGIES IP LIMITED (BB)

( * ) Notice: Subject to any disclaimer, the term of this patent is extended or adjusted under 35 U.S.C. 154(b) by 184 days.

(21) Appl. No.: 15/982,344

(22) Filed: May 17, 2018

(65) Prior Publication Data
US 2019/0353169 A1 Nov. 21, 2019

(51) Int. Cl.
| | | |
|---|---|---|
| *F04D 13/06* | (2006.01) | |
| *F04D 29/046* | (2006.01) | |
| *F04D 5/00* | (2006.01) | |
| *F04D 29/62* | (2006.01) | |
| *H02K 1/17* | (2006.01) | |
| *H02K 5/167* | (2006.01) | |
| *H02K 5/15* | (2006.01) | |
| *F04D 29/52* | (2006.01) | |
| *F04D 29/18* | (2006.01) | |
| *F04D 29/66* | (2006.01) | |

(52) U.S. Cl.
CPC ........... *F04D 29/528* (2013.01); *F04D 5/007* (2013.01); *F04D 13/06* (2013.01); *F04D 29/046* (2013.01); *F04D 29/181* (2013.01); *F04D 29/628* (2013.01); *H02K 1/17* (2013.01); *H02K 5/15* (2013.01); *H02K 5/1672* (2013.01); *F04D 13/0633* (2013.01); *F04D 29/669* (2013.01)

(58) Field of Classification Search
CPC ........ F04C 2/102; F04C 11/008; F04D 13/06; F04D 29/528; F04D 29/669; F04D 29/181
See application file for complete search history.

(56) References Cited

U.S. PATENT DOCUMENTS

| | | | | |
|---|---|---|---|---|
| 2,294,322 | A * | 8/1942 | Van Der Woude | .... H02K 1/143 336/210 |
| 6,102,684 | A * | 8/2000 | Tuckey | ................... F02M 37/04 418/15 |
| 6,824,361 | B2 | 11/2004 | Yu et al. | |
| 7,362,578 | B2 * | 4/2008 | Hornung | ............. H01L 23/4093 165/185 |
| 9,263,918 | B2 * | 2/2016 | Burton | ...................... H02K 1/18 |
| 9,557,509 | B2 * | 1/2017 | Skolozdra | ............ G02B 6/4435 |

(Continued)

*Primary Examiner* — Dominick L Plakkoottam
(74) *Attorney, Agent, or Firm* — Joshua M. Haines

(57) ABSTRACT

A fluid pump includes an inlet plate having an inlet; an outlet plate having an outlet plate outlet passage; an outlet which discharges fluid from the fuel pump; an electric motor having a shaft which rotates about an axis; a pumping element rotationally coupled to the shaft such that rotation of the pumping element by the shaft causes fluid to be pumped from the inlet to the outlet plate outlet passage and through the outlet; and a retention clip. The retention clip includes a central portion, a first leg which extends laterally from one end of the central portion, and a second leg which extends laterally from the other end of the central portion. The inlet plate includes an inlet plate slot within which the first leg is located and the outlet plate includes an outlet plate slot within which the second leg is located.

9 Claims, 12 Drawing Sheets

(56) References Cited

U.S. PATENT DOCUMENTS

| | | | |
|---|---|---|---|
| 9,968,874 B2 * | 5/2018 | Moreno | B01D 35/0276 |
| 2007/0241629 A1 * | 10/2007 | Ionel | H02K 3/487 |
| | | | 310/214 |
| 2008/0110218 A1 * | 5/2008 | Allen | E06B 9/02 |
| | | | 70/158 |
| 2014/0132106 A1 * | 5/2014 | Horst | H02K 1/12 |
| | | | 310/216.001 |
| 2014/0314591 A1 | 10/2014 | Herrera et al. | |
| 2017/0328363 A1 * | 11/2017 | Morton | F04C 15/06 |

* cited by examiner

FLUID PUMP

TECHNICAL FIELD OF INVENTION

The present invention relates to a fluid pump; more particularly to a fluid pump with an inlet plate, an outlet plate, and a pumping element between the inlet plate and the outlet plate; and even more particularly to a fluid pump with retention means for retaining the inlet plate and the outlet plate to each other before the inlet plate and outlet plate are fixed within a housing of the fluid pump.

BACKGROUND OF INVENTION

Fluid pumps, and more particularly fuel pumps for pumping fuel, for example, from a fuel tank of a motor vehicle to an internal combustion engine of the motor vehicle, are known. U.S. Pat. No. 6,824,361 to Yu et al. shows a typical electric fuel pump which includes an impeller located axially between stationary inlet and outlet plates. Rotation of the impeller by an electric motor pumps fuel to an outlet of the fuel pump such that an armature of the electric motor is located in the flow path taken by the fuel in order for the fuel to reach the outlet of the fuel pump. During manufacture, the inlet plate, the impeller, and the outlet plate form a subassembly which is subsequently inserted into a housing of the fuel pump. In order to fix the inlet plate and the outlet plate within the housing, the ends of the housing are crimped, thereby applying an axial load on the inlet plate and the outlet plate which in turn prevents relative rotation between the inlet plate and the outlet plate. It is known that proper orientation of the inlet plate relative to the outlet plate is important for optimal efficiency of the fuel pump in use. However, without some way to maintain the inlet plate, impeller, and outlet plate as a subassembly prior to the ends of the housing being crimped, alignment may be compromised.

What is needed is a fluid pump which minimizes or eliminates one or more of the shortcomings as set forth above.

SUMMARY OF THE INVENTION

Briefly described, a fluid pump includes an inlet plate having an inlet; an outlet plate having an outlet plate outlet passage; an outlet which discharges fluid from the fuel pump; an electric motor having a shaft which rotates about an axis; a pumping element rotationally coupled to the shaft such that rotation of the pumping element by the shaft causes fluid to be pumped from the inlet to the outlet plate outlet passage and through the outlet, the pumping element being located axially between the inlet plate and the outlet plate; and a retention clip which includes a retention clip central portion which extends from a retention clip first end to a retention clip second end, a retention clip first leg which extends laterally from the retention clip first end and which includes a first leg inner surface, and a retention clip second leg which extends laterally from the retention clip second end and which includes a second leg inner surface such that the first leg inner surface and the second leg inner surface face toward each other; wherein the inlet plate includes an inlet plate slot within which the retention clip first leg is located and the outlet plate includes an outlet plate slot within which the retention clip second leg is located. By providing the fluid pump with the retention clip and the features of the inlet plate and the outlet plate, the inlet plate, the outlet plate, and the pumping element can be reliably be held together as a subassembly prior to the inlet plate, the outlet plate, and the pumping element being fixed within the fluid pump during manufacture.

BRIEF DESCRIPTION OF DRAWINGS

This invention will be further described with reference to the accompanying drawings in which.

DETAILED DESCRIPTION OF INVENTION

Figure 1:
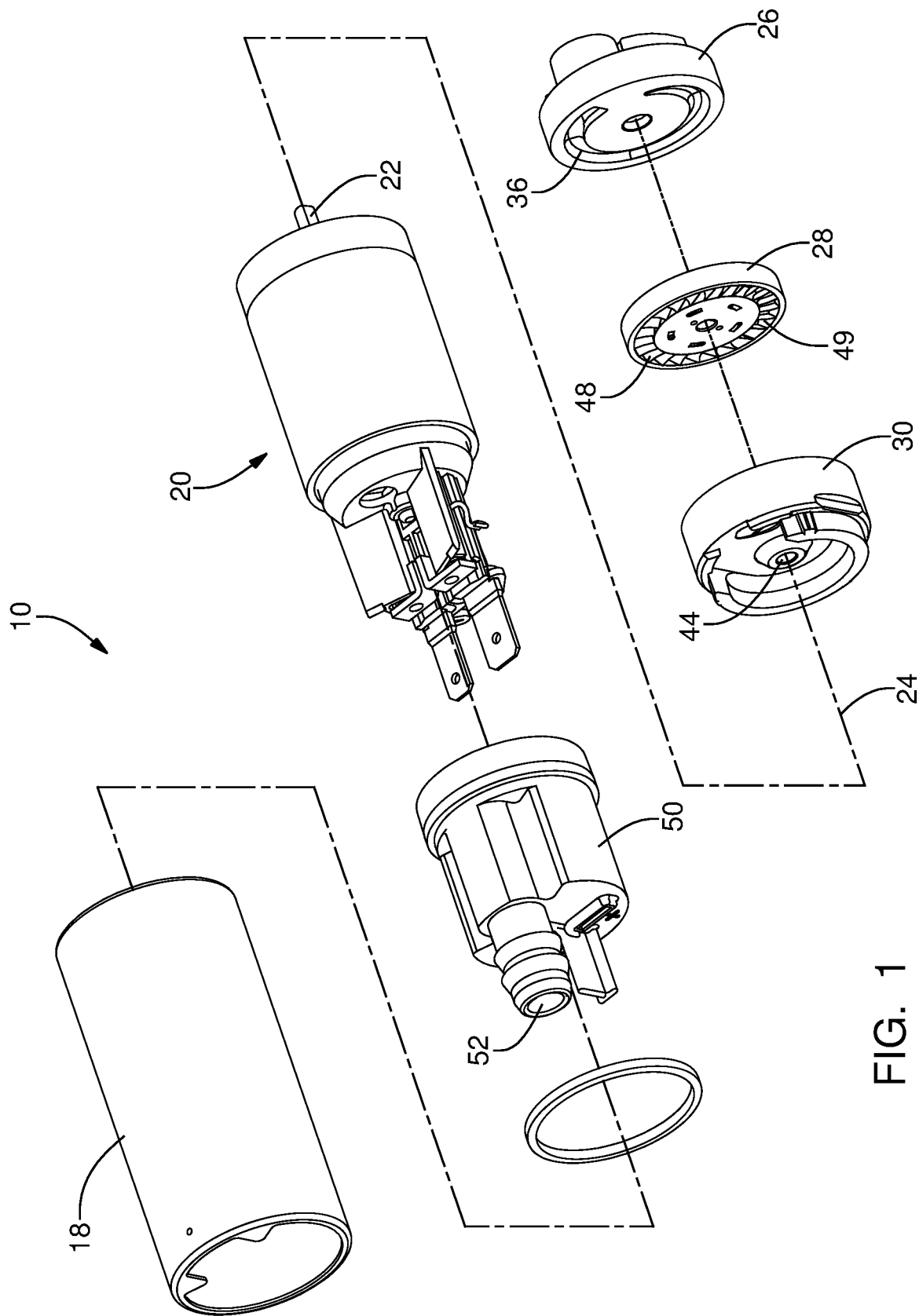
FIG. 1 is an exploded isometric view of a fluid pump in accordance with the present invention.
Figure 2:
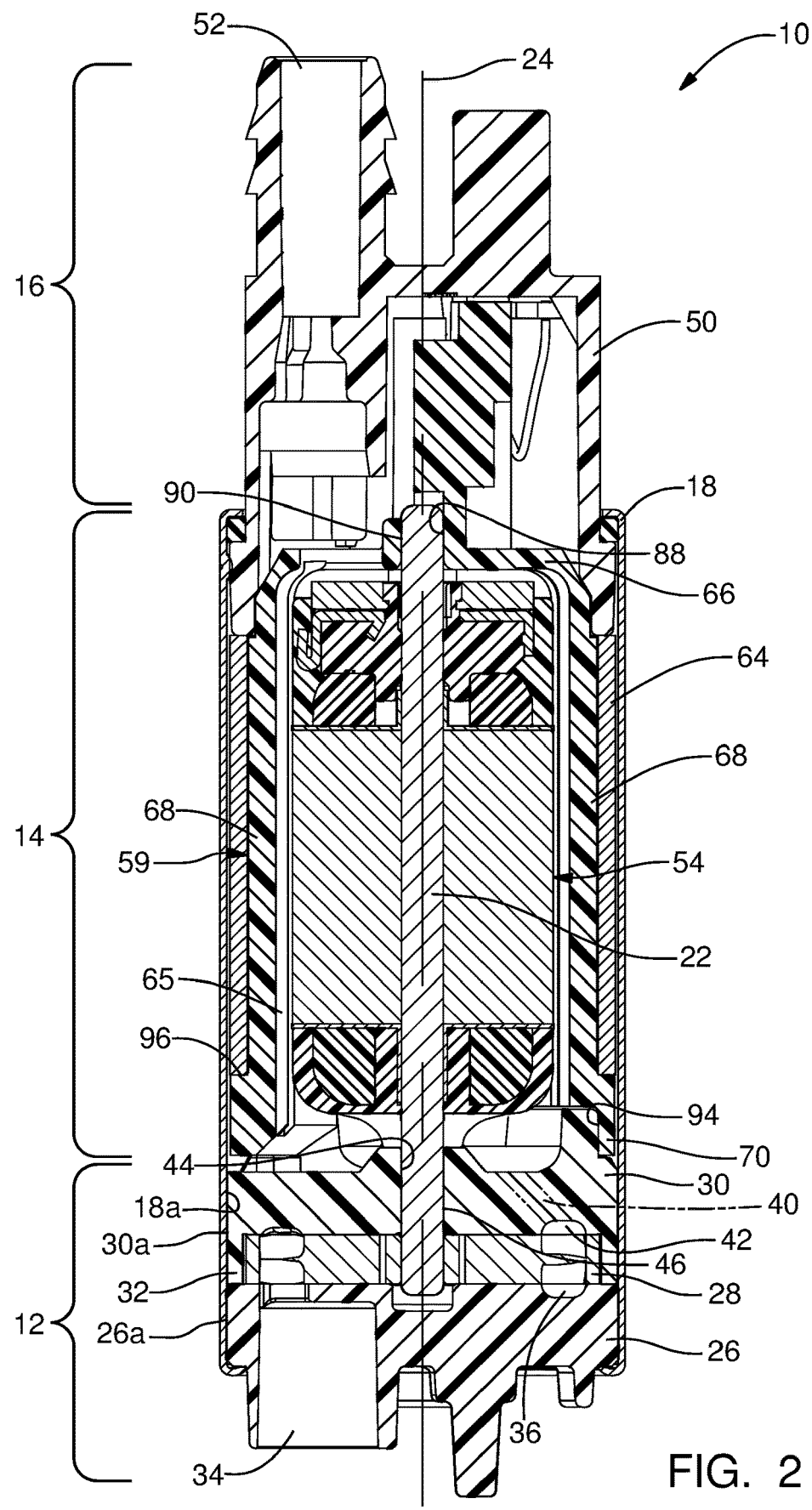
FIG. 2 is an axial cross-sectional view of the fluid pump in accordance with the present invention.
Figure 3:
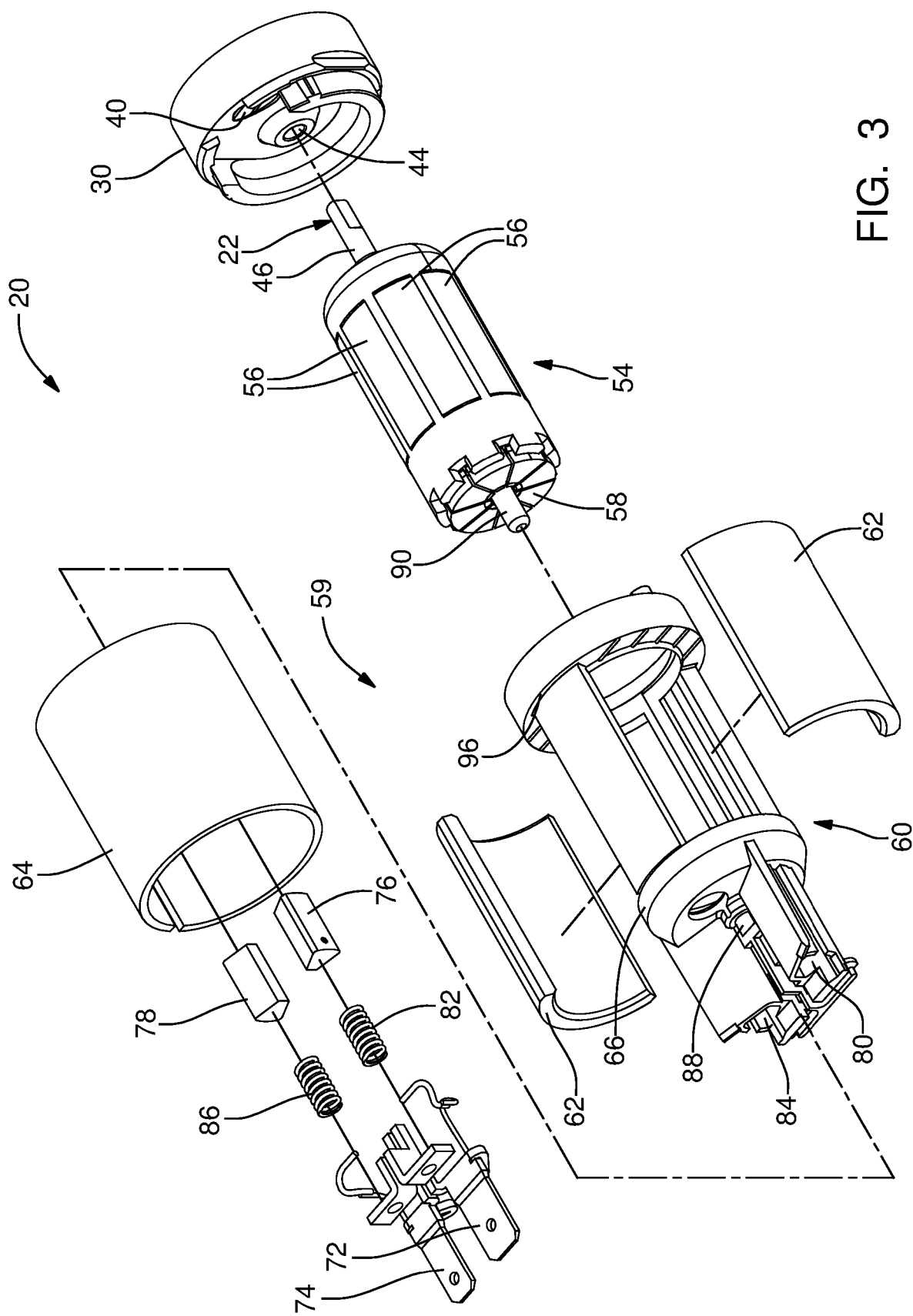
FIG. 3 is an exploded isometric view of a portion of the fluid pump in accordance with the present invention.
Figure 5:
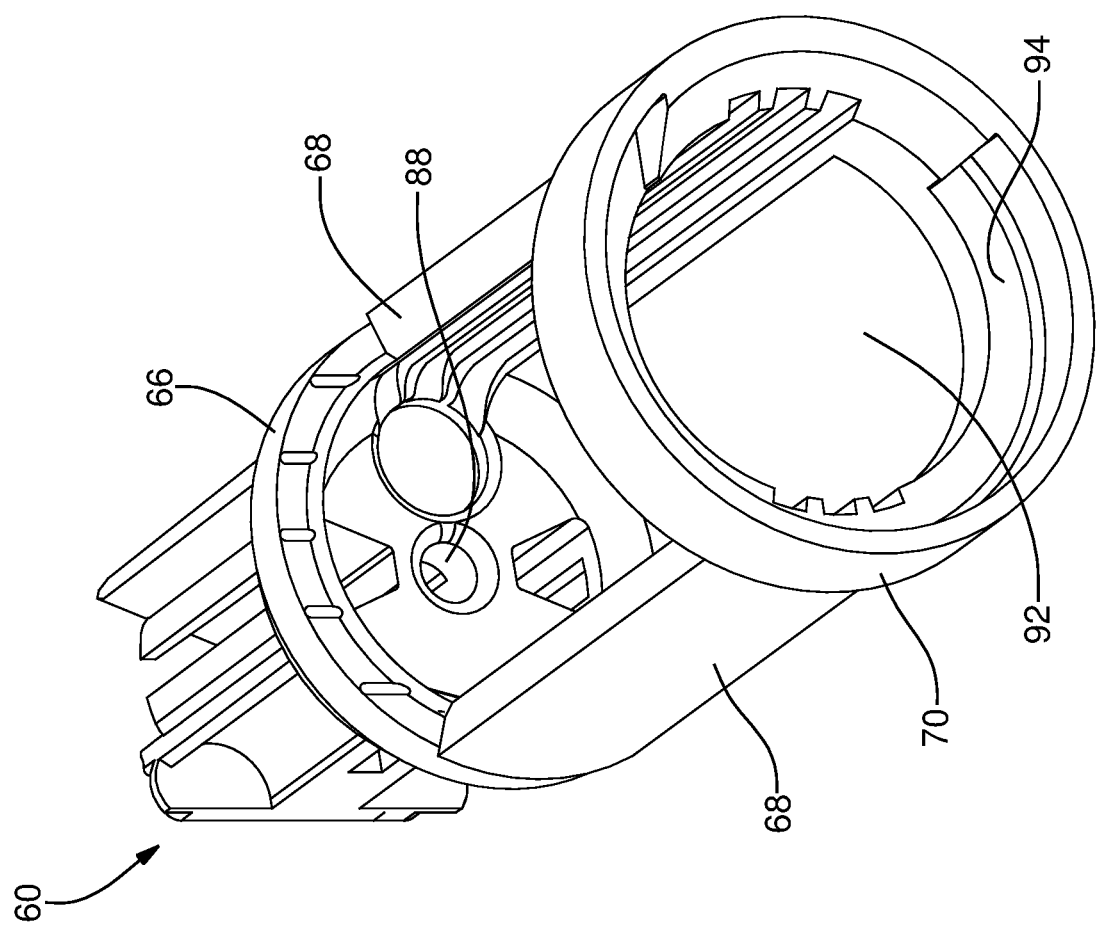
FIG. 5 is an isometric view of the motor frame of FIG. 4, now shown in a different orientation.
Figure 4:
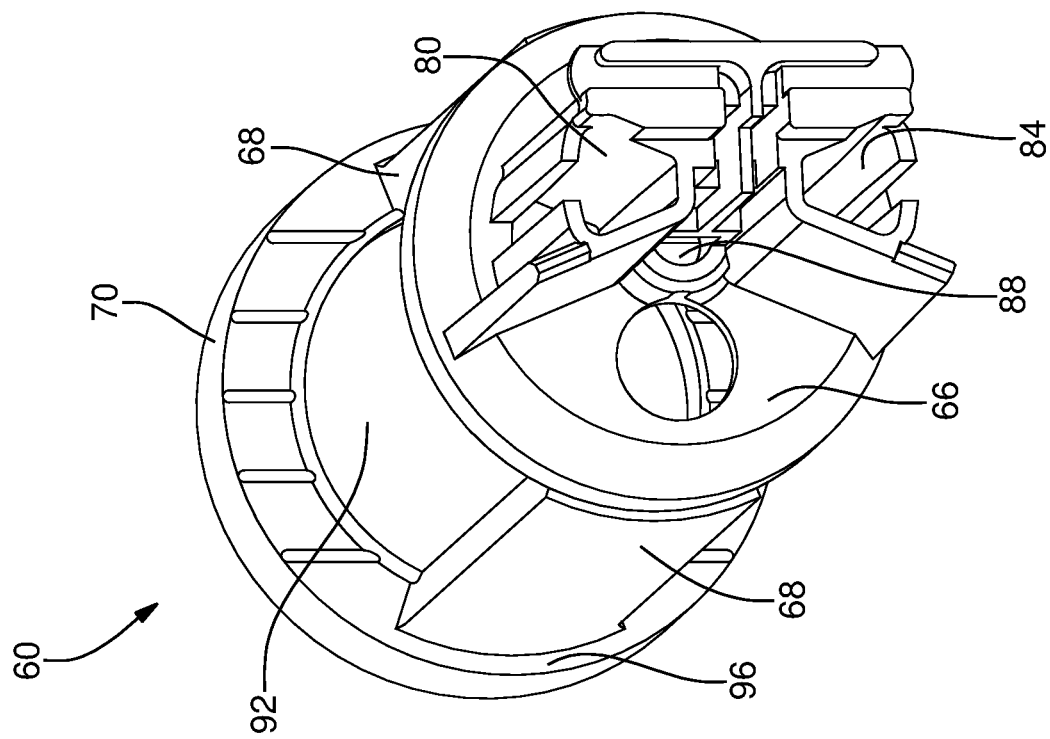
FIG. 4 is an isometric view of a motor frame of the fluid pump in accordance with the present invention.

Reference will first be made to FIGS. 1 and 2 which are an exploded isometric view and an axial cross-sectional view respectively of a fluid pump illustrated as fuel pump 10 for pumping liquid fuel, for example gasoline, from a fuel tank (not shown) to an internal combustion engine (not shown). While the fluid pump is illustrated as fuel pump 10, it should be understood that the invention is not to be limited to a fuel pump, but could also be applied to fluid pumps for pumping fluids other than fuel. Fuel pump 10 generally includes a pump section 12 at one end, a motor section 14 adjacent to pump section 12, and an outlet section 16 adjacent to motor section 14 at the end of fuel pump 10 opposite pump section 12. A housing 18 of fuel pump 10 retains pump section 12, motor section 14 and outlet section 16 together. Fuel enters fuel pump 10 at pump section 12, a portion of which is rotated by motor section 14 as will be described in more detail later, and is pumped past motor section 14 to outlet section 16 where the fuel exits fuel pump 10.

Motor section 14 includes an electric motor 20 which is disposed within housing 18. Electric motor 20 includes a shaft 22 extending therefrom into pump section 12. Shaft 22 rotates about an axis 24 when an electric current is applied to electric motor 20. Electric motor 20 will be described in greater detail later.

With continued reference to FIGS. 1 and 2, pump section 12 includes an inlet plate 26, a pumping element illustrated as impeller 28, and an outlet plate 30. Inlet plate 26 is disposed at the end of pump section 12 that is distal from motor section 14 while outlet plate 30 is disposed at the end of pump section 12 that is proximal to motor section 14. Both inlet plate 26 and outlet plate 30 are fixed relative to housing 18 to prevent relative movement between inlet plate 26 and outlet plate 30 with respect to housing 18. Outlet plate 30 defines a spacer ring 32 on the side of outlet plate 30 that faces toward inlet plate 26. Impeller 28 is disposed axially between inlet plate 26 and outlet plate 30 such that impeller 28 is radially surrounded by spacer ring 32. Impeller 28 is fixed to shaft 22 such that impeller 28 rotates with shaft 22 in a one-to-one relationship. Spacer ring 32 is dimensioned to be slightly thicker than the dimension of impeller 28 in the direction of axis 24, i.e. the dimension of spacer ring 32 in the direction of axis 24 is greater than the dimension of impeller 28 in the direction of axis 24. In this way, inlet plate 26, outlet plate 30, and spacer ring 32 are fixed within housing 18, for example by crimping the axial ends of housing 18. Axial forces created by the crimping process will be carried by spacer ring 32, thereby preventing impeller 28 from being clamped tightly between inlet plate 26 and outlet plate 30 which would prevent impeller 28 from rotating freely. Spacer ring 32 is also dimensioned to have an inside diameter that is larger than the outside diameter of impeller 28 to allow impeller 28 to rotate freely within spacer ring 32 and axially between inlet plate 26 and outlet plate 30. While the pumping element has been illustrated as impeller 28, it should now be understood that other pumping elements may alternatively be used, by way of non-limiting example only, a gerotor, gears, or roller vanes. Furthermore, while spacer ring 32 is illustrated as being made as a single piece with outlet plate 30, it should be understood that spacer ring 32 may alternatively be made as a separate piece that is captured axially between outlet plate 30 and inlet plate 26.

Inlet plate 26 is generally cylindrical in shape, and includes an inlet 34 that extends through inlet plate 26 in the same direction as axis 24. Inlet 34 is a passage which introduces fuel into fuel pump 10. Inlet plate 26 also includes an inlet plate flow channel 36 formed in the face of inlet plate 26 that faces toward impeller 28. Inlet plate flow channel 36 is in fluid communication with inlet 34.

Outlet plate 30 is generally cylindrical in shape and includes an outlet plate outlet passage 40 that extends through outlet plate 30 in the same direction as axis 24 where it should be noted that outlet plate outlet passage 40 is an outlet for pump section 12. Outlet plate outlet passage 40 is in fluid communication with outlet section 16 as will be describe in more detail later. Outlet plate 30 also includes an outlet plate flow channel 42 formed in the face of outlet plate 30 that faces toward impeller 28. Outlet plate flow channel 42 is in fluid communication with outlet plate outlet passage 40. Outlet plate 30 also includes an outlet plate aperture, hereinafter referred to as lower bearing 44, extending through outlet plate 30. Shaft 22 extends through lower bearing 44 in a close fitting relationship such that shaft 22 is able to rotate freely within lower bearing 44 and such that radial movement of shaft 22 within lower bearing 44 is limited to the manufacturing tolerances of shaft 22 and lower bearing 44. In this way, lower bearing 44 radially supports a lower end 46 of shaft 22 that is proximal to pump section 12.

Impeller 28 includes a plurality of impeller blades 48 arranged in a polar array radially surrounding and centered about axis 24 such that impeller blades 48 are aligned with inlet plate flow channel 36 and outlet plate flow channel 42. Impeller blades 48 are each separated from each other by an impeller blade chamber 49 that passes through impeller 28 in the general direction of axis 24. Impeller 28 may be made, for example only, by a plastic injection molding process in which the preceding features of impeller 28 are integrally molded as a single piece of plastic.

Outlet section 16 includes an end cap 50 having an outlet 52 for discharging fuel from fuel pump 10. Outlet 52 may be connected to, for example only, a conduit (not shown) for supplying fuel to an internal combustion engine (not shown). Outlet 52 is in fluid communication with outlet plate outlet passage 40 of outlet plate 30 for receiving fuel that has been pumped by pump section 12.

With continued reference to FIGS. 1 and 2 and with additional reference to FIGS. 3-6, electric motor 20 includes a rotor or armature 54 with a plurality of circumferentially spaced motor windings 56, and a commutator portion 58 where shaft 22 extends in each direction from armature 54 such that armature 54 rotates about axis 24. Electric motor 20 also includes a stator 59 with a motor frame 60, a pair of permanent magnets 62, and a flux carrier 64. Each magnet 62 is in the shape of a segment of a hollow cylinder. Stator 59 circumferentially surrounds armature 54 such that a fluid passage 65 is defined radially between armature 54 and stator 59 and such that fuel flows axially through fluid passage 65 from inlet 34 to outlet 52. Motor frame 60 includes a top section 66 that is proximal to outlet section 16, a plurality of circumferentially spaced legs 68 extending axially from top section 66 toward pump section 12, and a base section 70 axially spaced apart from top section 66 by legs 68. Top section 66, legs 68, and base section 70 are preferably integrally formed from a single piece of plastic, for example only, by a plastic injection molding process.

Top section 66 of motor frame 60 includes a first electrical terminal 72 and a second electrical terminal 74 extending therefrom and protruding through end cap 50. First electrical terminal 72 and second electrical terminal 74 are arranged to be connected to a power source (not shown) such that first electrical terminal 72 and second electrical terminal 74 are opposite in polarity. First electrical terminal 72 and second electrical terminal 74 may be disposed within pre-formed openings in top section 66 or first electrical terminal 72 and second electrical terminal 74 may be insert molded with top section 66 when motor frame 60 is formed by a plastic injection molding process. First electrical terminal 72 is in electrical communication with a first carbon brush 76 while second electrical terminal 74 is in electrical communication with a second carbon brush 78. First carbon brush 76 is disposed within a first brush holder 80 that is defined by top section 66 and is urged into contact with commutator portion 58 of armature 54 by a first brush spring 82 that is grounded to end cap 50. Second carbon brush 78 is disposed within a second brush holder 84 defined by top section 66 and is urged into contact with commutator portion 58 of armature 54 by a second brush spring 86 that is grounded to end cap 50. First carbon brush 76 and second carbon brush 78 deliver electrical power to motor windings 56 via commutator portion 58, thereby rotating armature 54 and shaft 22 about axis 24 in use.

Top section 66 of motor frame 60 defines an upper bearing 88 therein which radially supports an upper end 90 of shaft 22 that is proximal to outlet section 16. Shaft 22 is able to rotate freely within upper bearing 88 such that radial movement of shaft 22 within upper bearing 88 is limited to the manufacturing tolerances of shaft 22 and upper bearing 88.

Legs 68 are preferably equally circumferentially spaced around top section 66 and base section 70 and define motor frame openings 92 between legs 68. Motor frame openings 92 extend axially from top section 66 to base section 70. One magnet 62 is disposed within each motor frame opening 92 and magnets 62 may be inserted within respective motor frame openings 92 after motor frame 60 has been formed. Alternatively, magnets 62 may be insert molded with motor frame 60 when motor frame 60 is formed by a plastic injection molding process. In this way, magnets 62 and legs 68 radially surround armature 54. While two legs 68 and two magnets 62 have been illustrated, it should be understood that other quantities of legs 68 and magnets 62 may be used.

Base section 70 may be annular in shape and connects legs 68 to each other. Base section 70 includes a base section recess 94 extending axially thereinto from the end of base section 70 that faces away from top section 66. Base section recess 94 is coaxial with upper bearing 88 and receives outlet plate 30 closely therein such that radial movement of outlet plate 30 within base section recess 94 is substantially prevented. Since base section recess 94 is coaxial with upper bearing 88, a coaxial relationship is maintained between lower bearing 44 and upper bearing 88 by base section 70. Base section 70 also defines an annular shoulder 96 that faces toward top section 66. Annular shoulder 96 may be substantially perpendicular to axis 24.

Flux carrier 64 is made of a ferromagnetic material and may take the form of a cylindrical tube. Flux carrier 64 closely radially surrounds legs 68 of motor frame 60 and magnets 62. Flux carrier 64 may be made, for example only, from a sheet of ferromagnetic material formed to shape by a rolling process. The end of flux carrier 64 that is proximal to base section 70 of motor frame 60 axially abuts annular should 96 of base section 70 while the end of flux carrier 64 that is proximal to top section 66 of motor frame 60 axially abuts a portion of end cap 50 that radially surrounds top section 66 of motor frame 60. In this way, flux carrier 64 is captured axially between end cap 50 and annular shoulder 96 of base section 70.

Since motor frame 60 may be made as a single piece, for example only, by a plastic injection molding process, upper bearing 88 and base section recess 94 can be made by a single piece of tooling, thereby allowing a high degree of control over the relative positions of upper bearing 88 and base section recess 94. Consequently, lower bearing 44 can more easily be maintained in a coaxial relationship with upper bearing 88. Similarly, since first brush holder 80 and second brush holder 84 may be defined by top section 66, for example only, by an injection molding process, first brush holder 80, second brush holder 84, and upper bearing 88 may be formed by a single piece of tooling, thereby allowing a high degree of control over the relative positions of first brush holder 80, second brush holder 84, and upper bearing 88. Consequently, first brush holder 80 and second brush holder 84 can be easily maintained parallel to axis 24 which may be important for first carbon brush 76 and second carbon brush 78 to adequately interface with commutator portion 58 of armature 54.

In operation, inlet 34 is exposed to a volume of fuel (not shown) which is to be pumped to, for example only, an internal combustion engine (not shown). An electric current is supplied to motor windings 56 in order to rotate shaft 22 and impeller 28. As impeller 28 rotates, fuel is drawn through inlet 34 into inlet plate flow channel 36. Impeller blade chambers 49 allow fuel from inlet plate flow channel 36 to flow to outlet plate flow channel 42. Impeller 28 subsequently discharges the fuel through outlet plate outlet passage 40 and consequently through outlet 52.

For proper operation and maximum efficiency, it is important to ensure proper orientation of inlet plate 26 relative to outlet plate 30 about axis 24. Unless somehow constrained, orientation of inlet plate 26 relative to outlet plate 30 about axis 24 may vary until inlet plate 26 and outlet plate 30 are fixed relative to housing 18 to prevent relative movement between inlet plate 26 and outlet plate 30 with respect to housing 18, for example, by crimping the axial ends of housing 18 as mentioned previously. In the paragraphs that follow and with particular reference to FIGS. 6-12, features of inlet plate 26 and outlet plate 30 will be described which maintain inlet plate 26, outlet plate 30, and impeller 28 as a subassembly prior to being fixed within housing 18 during manufacture of fuel pump 10 and which ensure proper orientation of inlet plate 26 relative to outlet plate 30 about axis 24.

Figure 6:
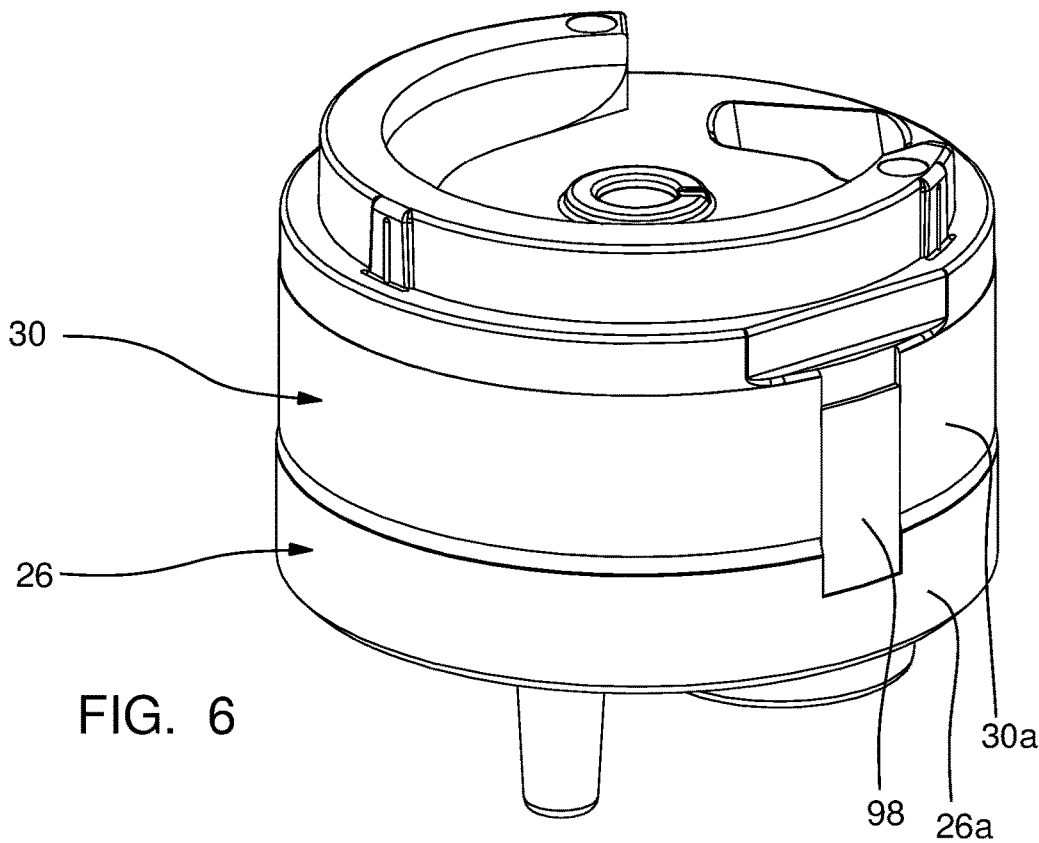
FIG. 6 is an isometric view of an inlet plate and an outlet plate of the fluid pump where the inlet plate and the outlet plate are shown assembled to each other before being assembled into a housing of the fluid pump.
Figure 7:
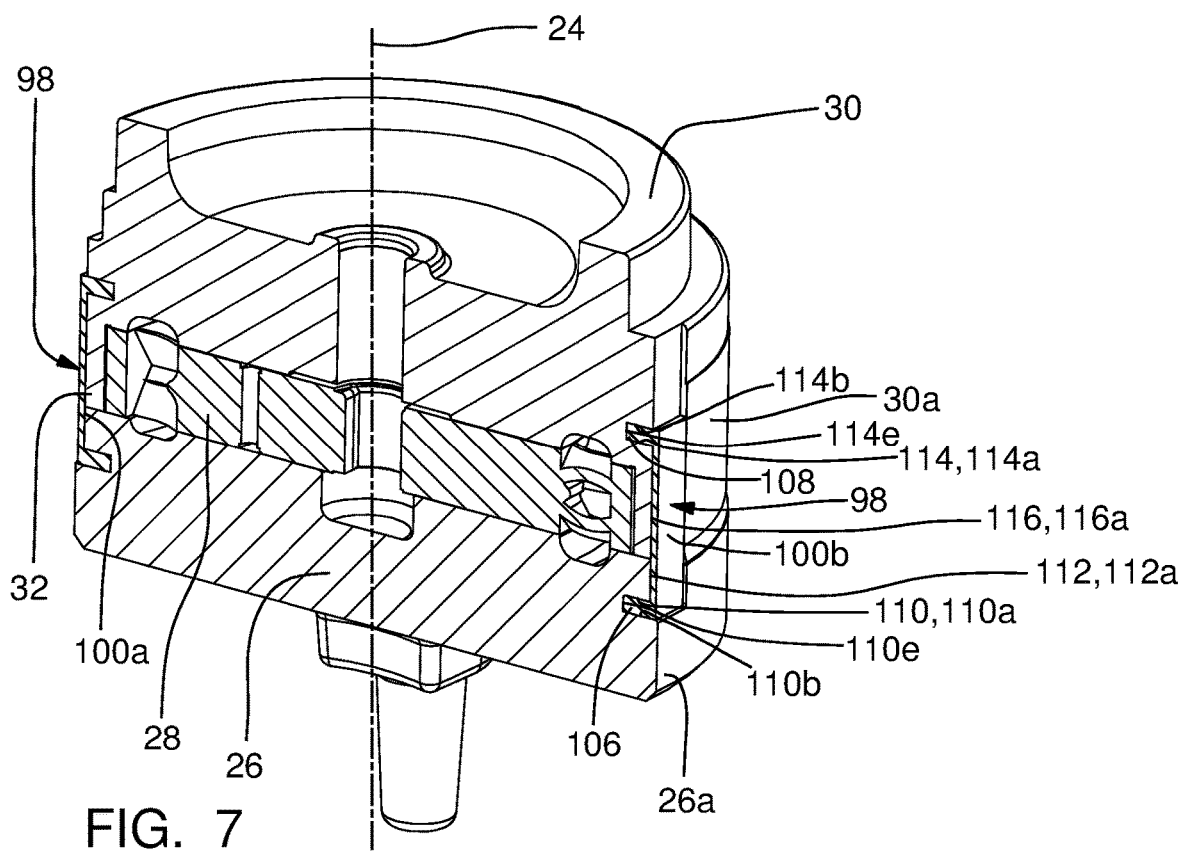
FIG. 7 is an axial cross-sectional view of the view of FIG. 6.
Figure 8:
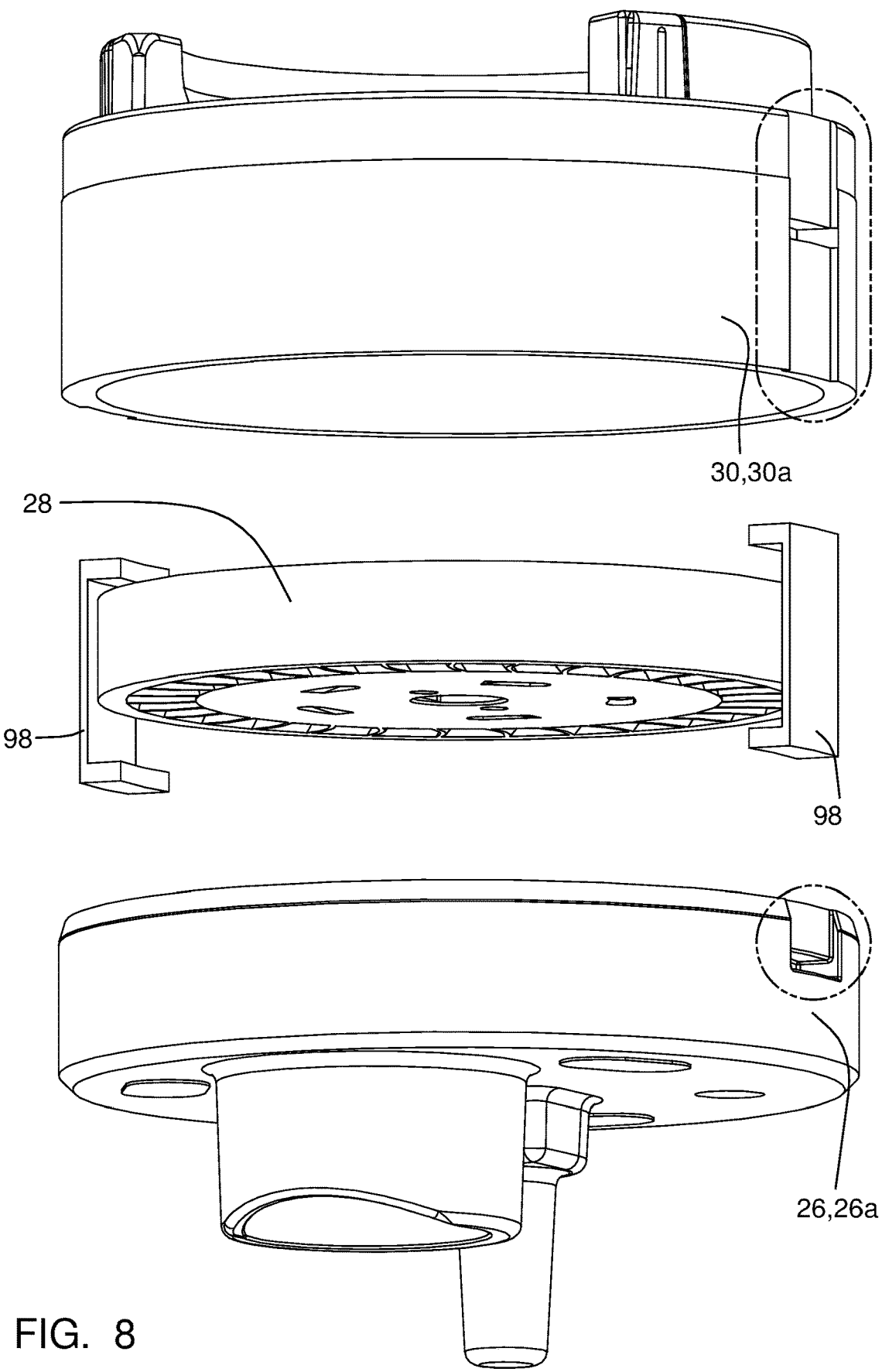
FIG. 8 is an exploded view of the view of FIG. 6.
Figure 9:
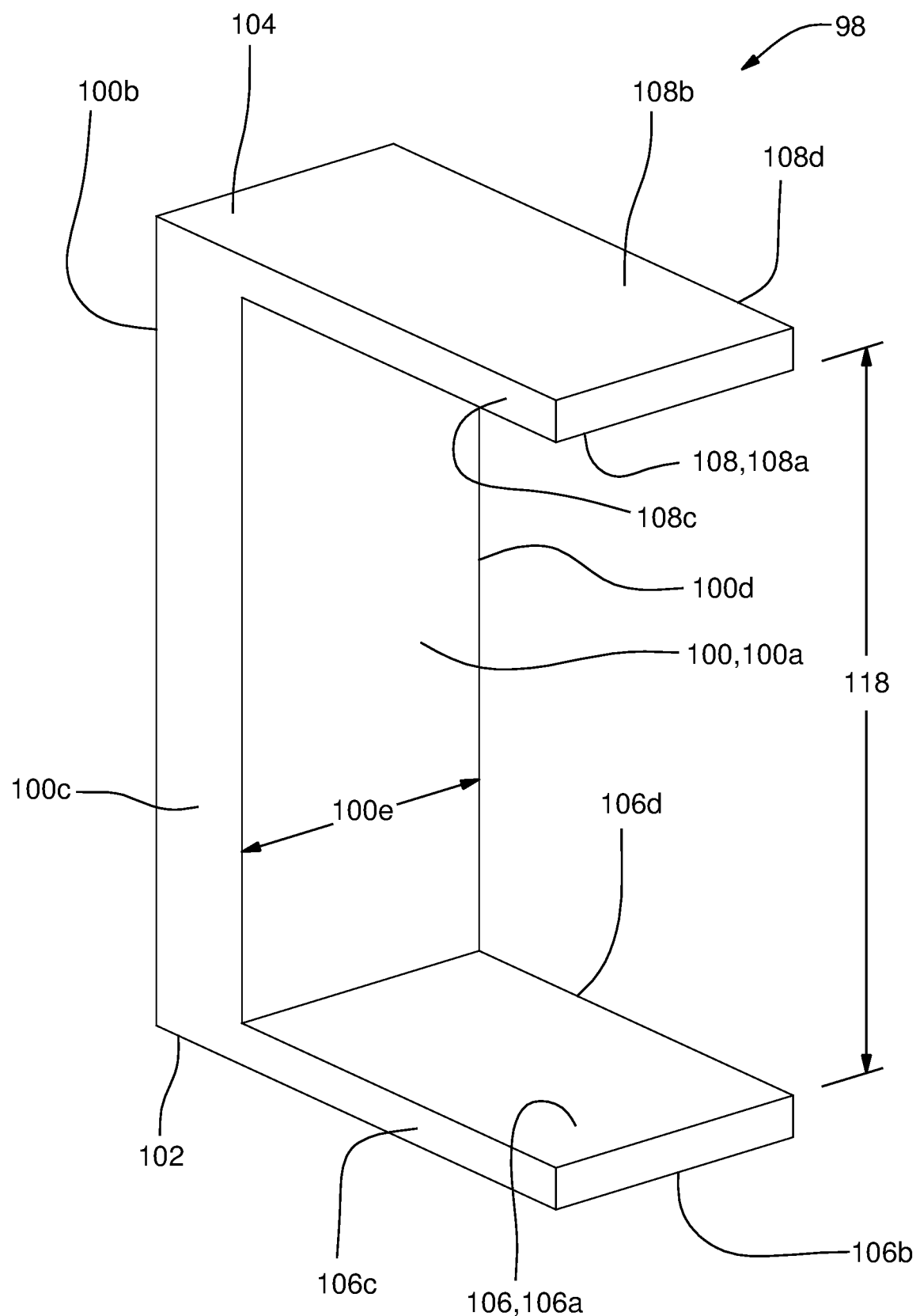
FIG. 9 is an isometric view of a retention clip of the fluid pump.
Figure 10:
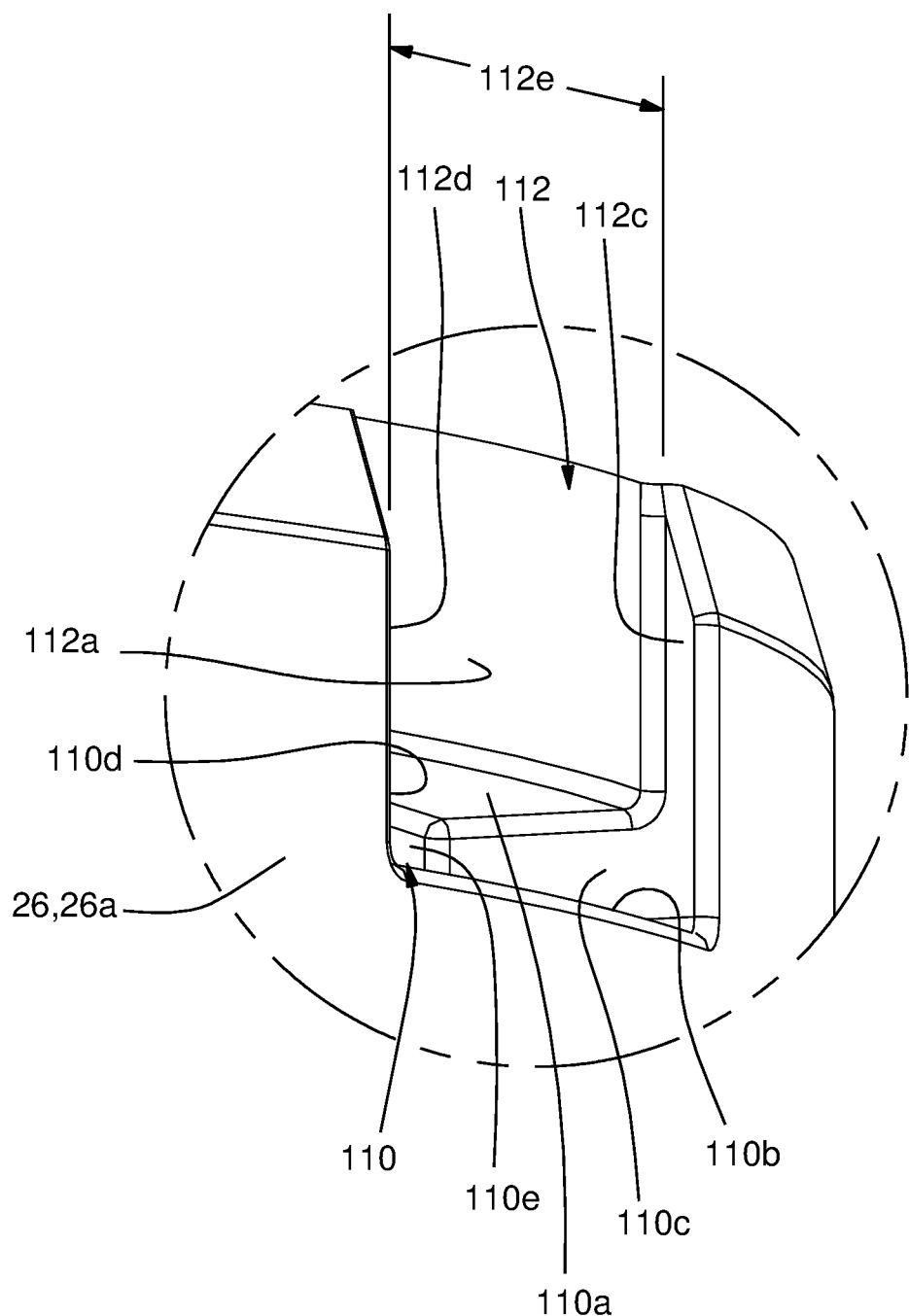
FIG. 10 is an enlarged portion of the inlet plate of the view of FIG. 8.
Figure 11:
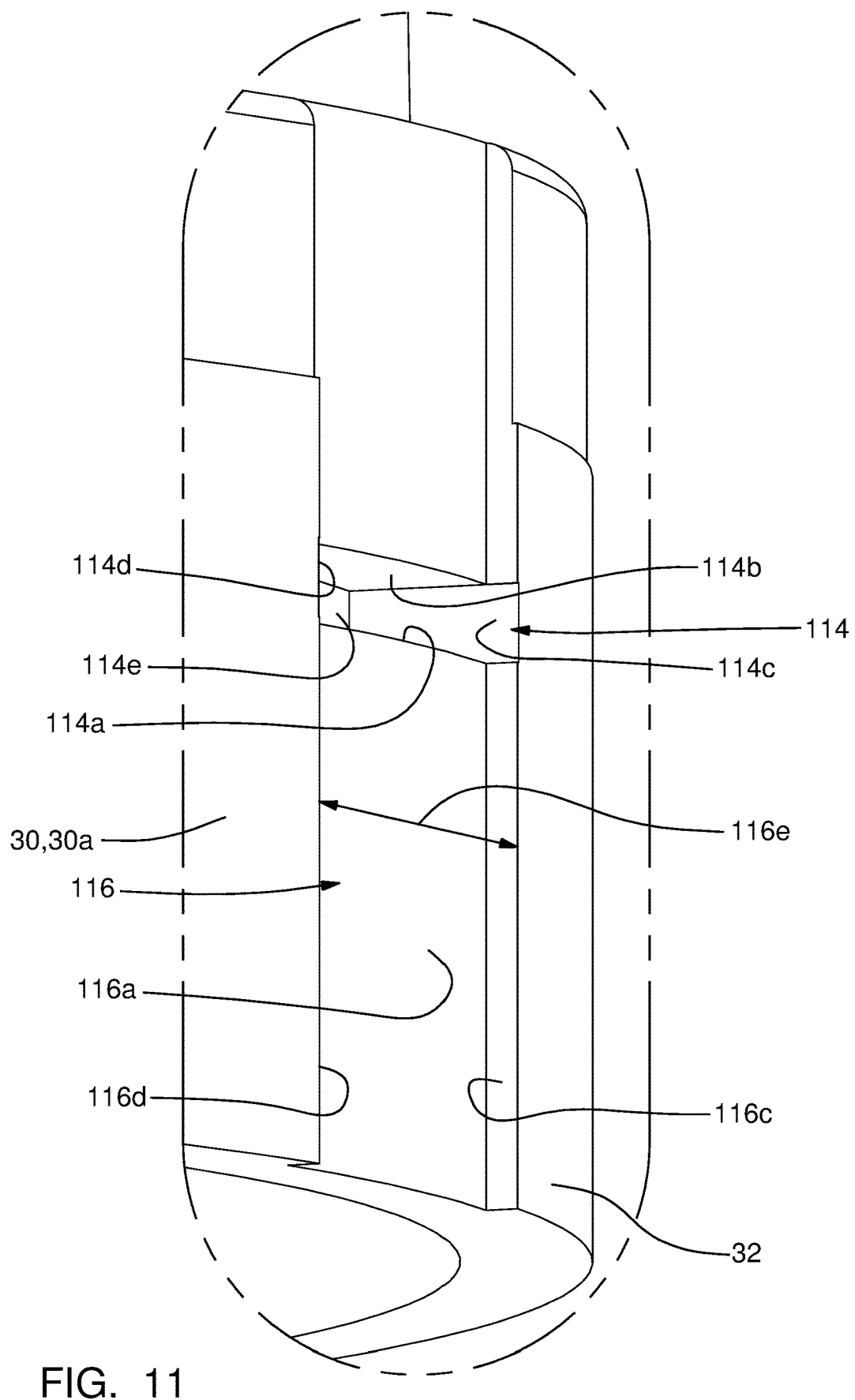
FIG. 11 is an enlarged portion of the outlet plate of the view of FIG. 8.
Figure 12:
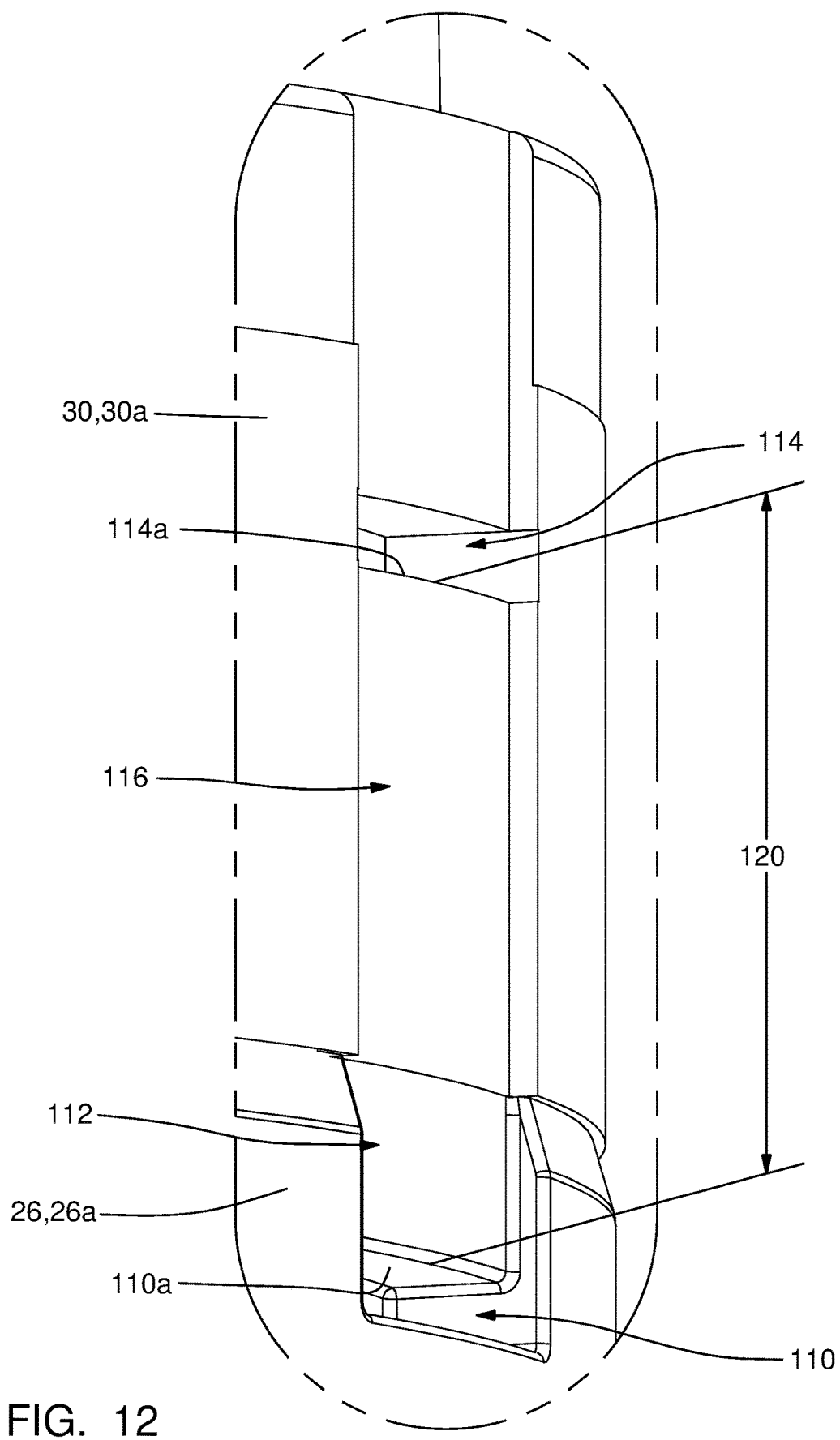
FIG. 12 is the enlarged portions of FIGS. 10 and 11, now showing the inlet plate and the outlet plate assembled to each other before being assembled into the housing of the fluid pump.

In order to retain inlet plate 26, outlet plate 30, and impeller 28 as a subassembly as shown in FIGS. 6 and 7 and in order to maintain proper orientation of inlet plate 26 relative to outlet plate 30, retention clips 98 are provided which engage complementary features of inlet plate 26 and outlet plate 30. While two retention clips 98 have been illustrated, it should be understood that a lesser or greater number of retention clips 98 may be utilized. Since each retention clip 98 may be substantially identical, only one retention clip 98 will be described in detail herein with the understanding that the description of retention clip 98 herein is equally applicable to each retention clip 98.

Retention clip 98 may be made of metal for, for example stainless steel or coated steel, and includes retention clip central portion 100 which extends from a retention clip first end 102 to a retention clip second end 104 in a first direction. Retention clip central portion 100 includes a central portion inner surface 100a which faces toward axis 24; a central portion outer surface 100b which is opposed to, and parallel with, central portion inner surface 100a and faces away from axis 24; a central portion first edge 100c; and a central portion second edge 100d such that central portion inner surface 100a and central portion outer surface 100b each extend from central portion first edge 100c to central portion second edge 100d for a central portion width 100e in a second direction that is perpendicular to the first direction. As can be seen most clearly in FIG. 7, retention clip central portion 100 is located radially outward from impeller 28.

Retention clip 98 also includes a retention clip first leg 106 which extends laterally from retention clip first end 102 toward axis 24. Retention clip first leg 106 includes a first leg inner surface 106a which intersects with central portion inner surface 100a; a first leg outer surface 106b which is opposed to, and parallel with, first leg inner surface 106a such that first leg outer surface 106b intersects with central portion outer surface 100b; a first leg first edge 106c; and a first leg second edge 106d such that first leg inner surface 106a and first leg outer surface 106b each extend from first leg first edge 106c to first leg second edge 106d in the second direction.

Retention clip 98 also includes a retention clip second leg 108 which extends laterally from retention clip second end 104 toward axis 24. Retention clip second leg 108 includes a second leg inner surface 108a which intersects with central portion inner surface 100a; a second leg outer surface 108b which is opposed to, and parallel with, second leg inner surface 108a such that second leg outer surface 108b intersects with central portion outer surface 100b; a second leg first edge 108c; and a second leg second edge 108d such that second leg inner surface 108a and second leg outer surface 108b each extend from second leg first edge 108c to second leg second edge 108d in the second direction. As shown in the figures, first leg inner surface 106a and second leg inner surface 108a face toward each other, and in this way, retention clip 98 has a generally C-shaped cross-section when sectioned by a plane which passes through retention clip central portion 100, retention clip first leg 106, and retention clip second leg 108.

Inlet plate 26 includes an inlet plate outer peripheral surface 26a which surrounds axis 24 and which faces away from axis 24 toward a housing inner surface 18a of housing 18. An inlet plate slot 110 extends into inlet plate 26 from inlet plate outer peripheral surface 26a and receives retention clip first leg 106 therein and an inlet plate groove 112 extends into inlet plate 26 from the inlet plate outer peripheral surface 26a and receives a portion of retention clip central portion 100 therein.

Inlet plate slot 110 includes an inlet plate slot first surface 110a which faces toward, and contacts, first leg inner surface 106a when retention clip first leg 106 is inserted within inlet plate slot 110; an inlet plate slot second surface 110b which faces toward first leg outer surface 106b when retention clip first leg 106 is inserted within inlet plate slot 110; an inlet plate slot first edge 110c which faces toward first leg first edge 106c when retention clip first leg 106 is inserted within inlet plate slot 110; and an inlet plate slot second edge 110d which faces toward first leg second edge 106d when retention clip first leg 106 is inserted within inlet plate slot 110 such that inlet plate slot first surface 110a and inlet plate slot second surface 110b each extend from inlet plate slot first edge 110c to inlet plate slot second edge 110d. Inlet plate slot 110 is terminated by an inlet plate slot end wall 110e which intersects with each of inlet plate slot first surface 110a, inlet plate slot second surface 110b, inlet plate slot first edge 110c, and inlet plate slot second edge 110d. As can be seen in the figures, retention clip first leg 106 is peripherally surrounded by inlet plate slot 110 when retention clip first leg 106 is inserted within inlet plate slot 110.

Inlet plate groove 112 extends into inlet plate 26 from the inlet plate outer peripheral surface 26a such that inlet plate groove 112 intersects with inlet plate slot 110 and extends parallel to axis 24 to the face of inlet plate 26 that faces toward impeller 28 and outlet plate 30/spacer ring 32. Inlet plate groove 112 includes an inlet plate groove first surface 112a which faces away from axis 24 which faces toward central portion inner surface 100a of retention clip central portion 100 when retention clip central portion 100 is inserted within inlet plate groove 112; an inlet plate groove first edge 112c which faces toward central portion first edge 100c of retention clip central portion 100 when retention clip central portion 100 is inserted within inlet plate groove 112; and an inlet plate groove second edge 112d which faces toward central portion second edge 100d of retention clip central portion 100 when retention clip central portion 100 is inserted within inlet plate groove 112 such that inlet plate groove first surface 112a extends from inlet plate groove first edge 112c to inlet plate groove second edge 112d for an inlet plate groove width 112e in the second direction.

Outlet plate 30 includes an outlet plate outer peripheral surface 30a which surrounds axis 24 and which faces away from axis 24 toward housing inner surface 18a of housing 18. An outlet plate slot 114 extends into outlet plate 30 from outlet plate outer peripheral surface 30a and receives retention clip second leg 108 therein and an outlet plate groove 116 extends into inlet plate 26 from the outlet plate outer peripheral surface 30a and receives a portion of retention clip central portion 100 therein.

Outlet plate slot 114 includes an outlet plate slot first surface 114a which faces toward, and contacts, second leg inner surface 108a when retention clip second leg 108 is inserted within outlet plate slot 114; an outlet plate slot second surface 114b which faces toward second leg outer surface 108b when retention clip second leg 108 is inserted within outlet plate slot 114; an outlet plate slot first edge 114c which faces toward second leg first edge 108c when retention clip second leg 108 is inserted within outlet plate slot 114; and an outlet plate slot second edge 114d which faces toward second leg second edge 108d when retention clip second leg 108 is inserted within outlet plate slot 114 such that outlet plate slot first surface 114a and outlet plate slot second surface 114b each extend from outlet plate slot first edge 114c to outlet plate slot second edge 114d. Outlet plate slot 114 is terminated by an outlet plate slot end wall 114e which intersects with each of outlet plate slot first surface 114a, outlet plate slot second surface 114b, outlet plate slot first edge 114c, and outlet plate slot second edge 114d. As can be seen in the figures, retention clip second leg 108 is peripherally surrounded by outlet plate slot 114 when retention clip second leg 108 is inserted within outlet plate slot 114.

Outlet plate groove 116 extends into outlet plate 30 from the outlet plate outer peripheral surface 30a such that outlet plate groove 116 intersects with outlet plate slot 114 and extends parallel to axis 24 to the face of spacer ring 32 which faces toward inlet plate 26. Outlet plate groove 116 includes an outlet plate groove first surface 116a which faces away from axis 24 and which faces toward central portion inner surface 100a of retention clip central portion 100 when retention clip central portion 100 is inserted within outlet plate groove 116; an outlet plate groove first edge 116c which faces toward central portion first edge 100c when retention clip central portion 100 of retention clip central portion 100 is inserted within outlet plate groove 116; and an outlet plate groove second edge 116d which faces toward central portion second edge 100d when retention clip central portion 100 of retention clip central portion 100 is inserted within outlet plate groove 116 such that outlet plate groove first surface 116a extends from outlet plate groove first edge 116c to outlet plate groove second edge 116d for an outlet plate groove width 116e in the second direction.

Retention clip central portion 100, inlet plate groove 112, and outlet plate groove 116 are made such that central portion width 100e, inlet plate groove width 112e, and outlet plate groove width 116e are sized in order to limit the magnitude to which inlet plate 26 and outlet plate 30 are able to rotate relative to each other about axis 24 prior to being fixed within housing 18. As should now be clear, the difference between central portion width 100e and inlet plate groove width 112e and the difference between central portion width 100e and outlet plate groove width 116e determine the magnitude to which inlet plate 26 and outlet plate 30 are able to rotate relative to each other about axis 24 prior to inlet plate 26 and outlet plate 30 being fixed within housing 18. Preferably, these differences are sized to allow less than 1° rotation about axis 24 between inlet plate 26 and outlet plate 30, however, a practitioner of ordinary skill in the art will be able to determine the allowable magnitude of rotation that provides the desired efficiency of fuel pump 10 and be able to size central portion width 100e, inlet plate groove width 112e, and outlet plate groove width 116e accordingly to achieve this allowable magnitude of rotation.

While retention clip central portion 100 is provided to limit rotation of inlet plate 26 and outlet plate 30 about axis 24 prior to inlet plate 26 and outlet plate 30 being fixed within housing 18, retention clip first leg 106 and retention clip second leg 108 are provided to prevent separation between inlet plate 26 and outlet plate 30 in the direction of axis 24 prior to inlet plate 26 and outlet plate 30 being fixed within housing 18. This is accomplished by sizing a distance 118 (best seen in FIG. 9 between first leg inner surface 106a and second leg inner surface 108a to be complementary to a distance 120 (best seen in FIG. 12) between inlet plate slot first surface 110a and outlet plate slot first surface 114a when inlet plate 26 is assembled to outlet plate 30. It should be noted that prior to inserting retention clip first leg 106 and retention clip second leg 108 into inlet plate slot 110 and outlet plate slot 114 respectively, distance 118 may be less than distance 120. In this way, inserting retention clip first leg 106 and retention clip second leg 108 into inlet plate slot 110 and outlet plate slot 114 respectively results in resilient deflection of retention clip first leg 106 relative to retention clip second leg 108 such that first leg inner surface 106a contacts inlet plate slot first surface 110a and second leg inner surface 108a contacts outlet plate slot inner surface 114a, and consequently, inlet plate 26 and outlet plate 30 are held in compression with each other between retention clip first leg 106 and retention clip second leg 108. Alternatively, distance 118 and distance 120 may be substantially the same prior to inserting retention clip first leg 106 and retention clip second leg 108 into inlet plate slot 110 and outlet plate slot 114 respectively, and consequently, first leg inner surface 106a contacts inlet plate slot first surface 110a and second leg inner surface 108a contacts outlet plate slot inner surface 114a, however, compression is not provided to inlet plate 26 and outlet plate 30.

Figure 13:
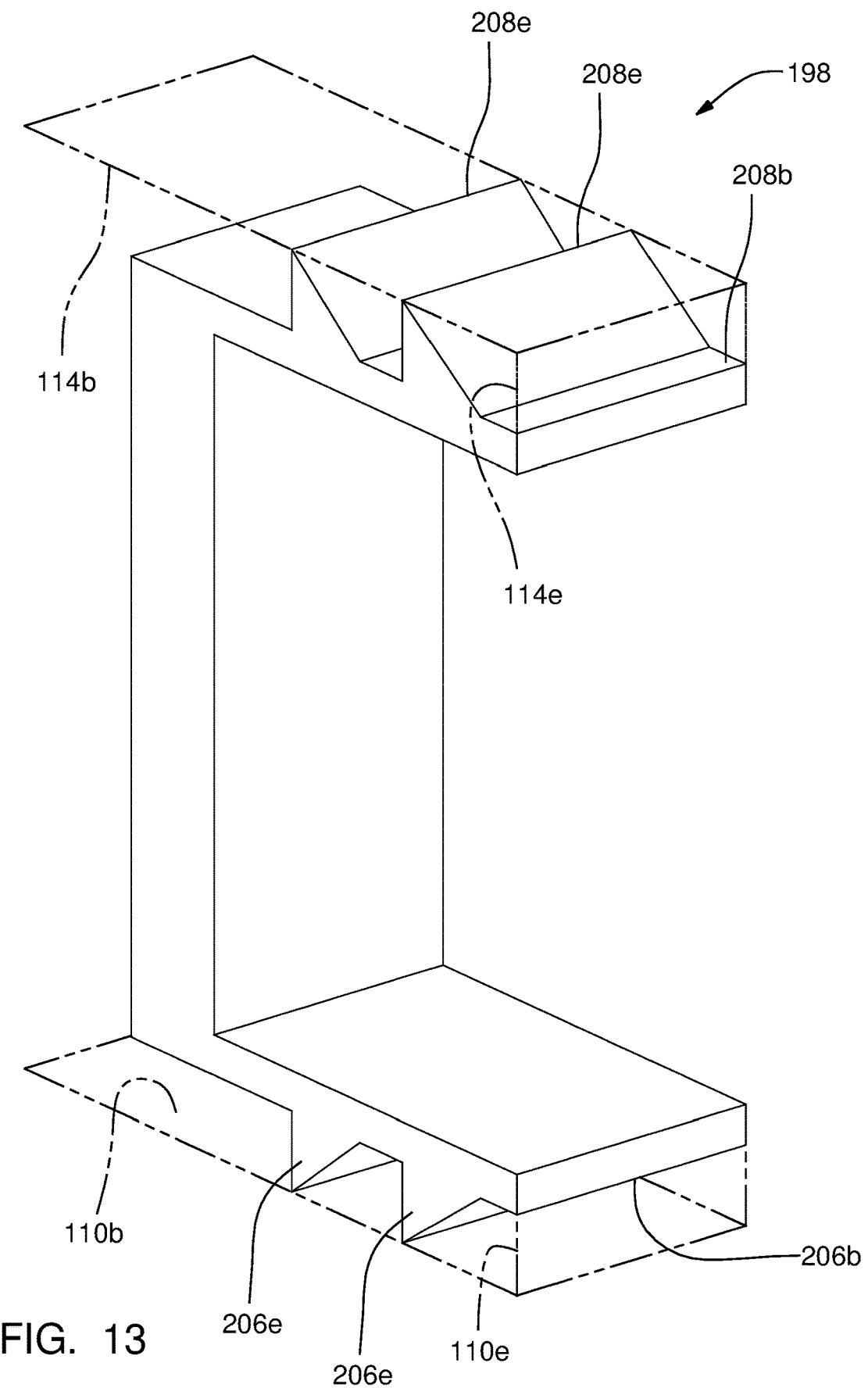
FIGS. 13 and 14 isometric views of variations to the retention clip of FIG. 9.

In order to ensure retention of retention clip 98, additional features be provided which engage inlet plate slot 110 and outlet plate slot 114 as will be described with respect to FIGS. 13 and 14. In a first example as shown in FIG. 13, a retention clip 198 is shown where elements of retention clip 98 that are similar are provided with reference numbers increased in number by one-hundred. Unlike retention clip 98 which has first leg outer surface 106b and second leg outer surface 108b which are planar, retention clip 198 includes first leg outer surface 206b and second leg outer surface 208b which each include one or more barbs 206e and one or more barbs 208e respectively. Barbs 206e taper from a smaller cross-sectional area proximal inlet plate slot end wall 110e (shown in phantom lines in FIG. 13) to a larger cross-sectional area distal from inlet plate slot end wall 110e, and similarly, barbs 208e taper from a smaller cross-sectional area proximal outlet plate slot end wall 114e to a larger cross-sectional area distal from outlet plate slot end wall 114e. In this way, barbs 206e and barbs 208e engage inlet plate slot second surface 110b (shown in phantom lines in FIG. 13) and outlet plate slot second surface 114b (shown in phantom lines in FIG. 13) respectively, thereby allowing for easy insertion of retention clip 198 while inhibiting removal of retention clip 198.

Figure 14:
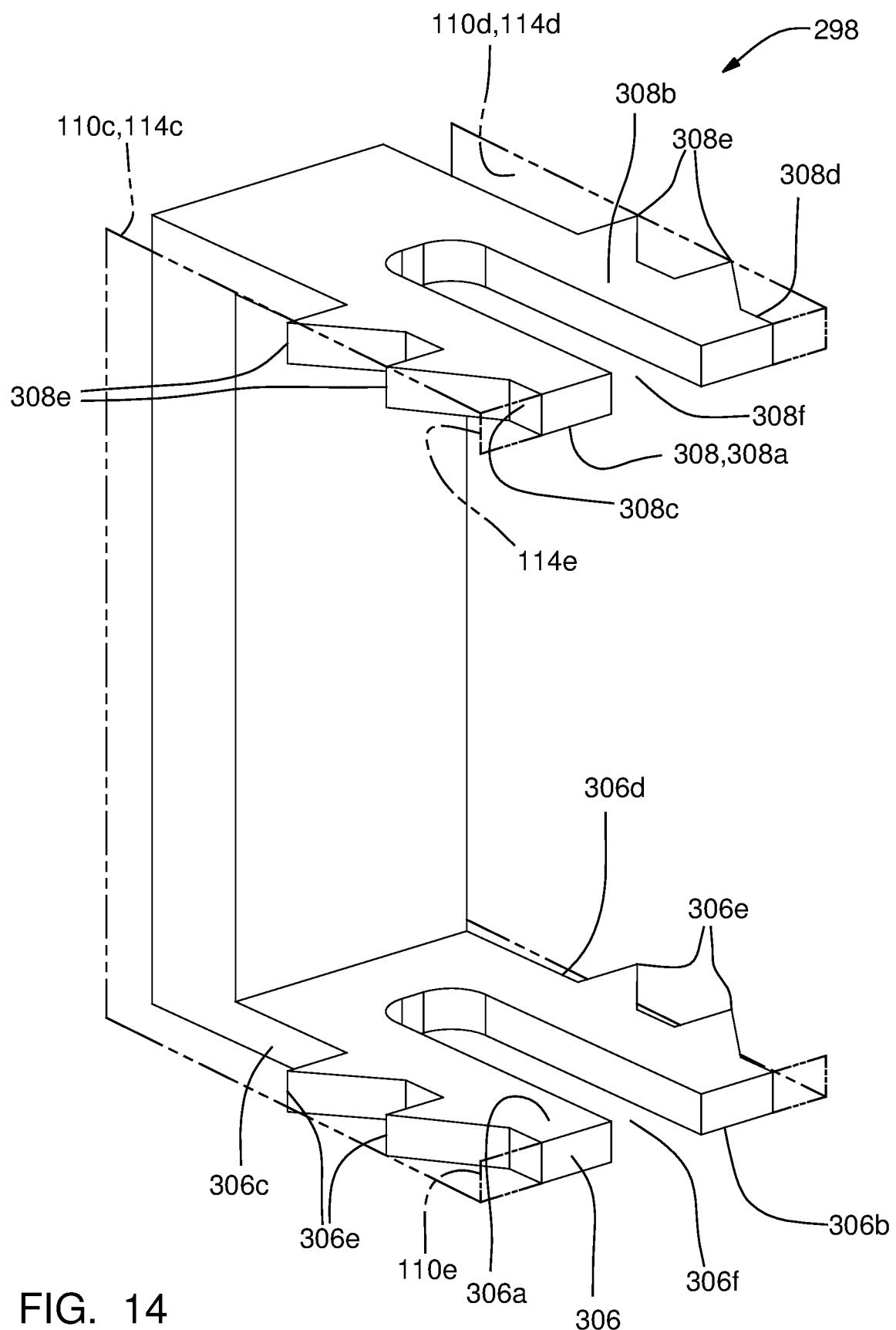

In a second example shown in FIG. 14, a retention clip 298 is shown where elements of retention clip 98 that are similar are provided with reference numbers increased in number by two-hundred. Unlike retention clip 98 which has first leg first edge 106c, first leg second edge 106d, second leg first edge 108c, and second leg second edge 108d which are planar, retention clip 298 includes first leg first edge 306c and first leg second edge 306d which each include one or more barbs 306e and also includes second leg first edge 308c and second leg second edge 308d which each include one or more barbs 308e. Barbs 306e taper from a smaller cross-sectional area proximal inlet plate slot end wall 110e to a larger cross-sectional area distal from inlet plate slot end wall 110e, and similarly, barbs 308e taper from a smaller cross-sectional area proximal outlet plate slot end wall 114e to a larger cross-sectional area distal from outlet plate slot end wall 114e. In this way, barbs 206e engage inlet plate slot first edge 110c and inlet plate slot second edge 110d and barbs 208e engage outlet plate slot first edge 114c and outlet plate slot second edge 114d, thereby allowing for easy insertion of retention clip 298 while inhibiting removal of retention clip 298. In order to provide further retention, a first leg retention slot 306f may be provided in retention clip first leg 306 such that first leg retention slot 306f extends from first leg inner surface 306a to first leg outer surface 306b. In this way, first leg first edge 306c and first leg second edge 306d are resiliently deflected inward when retention clip first leg 306 is inserted into inlet plate slot 110. Similarly, a second leg retention slot 308f may be provided in retention clip second leg 308 such that second leg retention slot 308f extends from second leg inner surface 308a to second leg outer surface 308b. In this way, second leg first edge 308c and second leg second edge 308d are resiliently deflected inward when retention clip second leg 308 is inserted into outlet plate slot 114. While retention clip 298 has been illustrated herein as including first leg retention slot 306f and second leg retention slot 308f, it should be understood that these features may alternatively be omitted.

Retention clips 98, 198, and 298 as described herein together with the complementary features of inlet plate 26 and outlet plate 30 provide for reliable positioning and retention of inlet plate 26 relative to outlet plate 30 prior to fixing of inlet plate 26 and outlet plate 30 within housing 18.

While this invention has been described in terms of preferred embodiments thereof, it is not intended to be so limited, but rather only to the extent set forth in the claims that follow.

We claim:
1. A fluid pump comprising:
an inlet plate having an inlet;
an outlet plate having an outlet plate outlet passage;
an outlet which discharges fluid from said fluid pump;
an electric motor having a shaft which rotates about an axis;
a pumping element rotationally coupled to said shaft such that rotation of said pumping element by said shaft causes fluid to be pumped from said inlet to said outlet plate outlet passage and through said outlet, said pumping element being located axially between said inlet plate and said outlet plate; and
a retention clip which includes a retention clip central portion which extends from a retention clip first end to a retention clip second end, a retention clip first leg which extends laterally from said retention clip first end and which includes a first leg inner surface, and a retention clip second leg which extends laterally from said retention clip second end and which includes a second leg inner surface such that said first leg inner surface and said second leg inner surface face toward each other;
wherein said inlet plate includes an inlet plate slot within which said retention clip first leg is located and said outlet plate includes an outlet plate slot within which said retention clip second leg is located such that said inlet plate and said outlet plate are axially secured to each other between said retention clip first leg and said retention clip second leg.

2. A fluid pump as in claim 1, wherein:
said first leg inner surface contacts said inlet plate within said inlet plate slot; and
said second leg inner surface contacts said outlet plate within said outlet plate slot.

3. A fluid pump as in claim 1, wherein said inlet plate and said outlet plate are axially compressed between said first leg inner surface and said second leg inner surface.

4. A fluid pump as in claim 1, wherein:
said retention clip first leg is peripherally surrounded by said inlet plate slot; and
said retention clip second leg is peripherally surrounded by said outlet plate slot.

5. A fluid pump as in claim 1, wherein:
said inlet plate includes an inlet plate outer peripheral surface which surrounds said axis and also includes an inlet plate groove which extends into said inlet plate outer peripheral surface;
said outlet plate includes an outlet plate outer peripheral surface which surrounds said axis and also includes an outlet plate groove which extends into said outlet plate outer peripheral surface; and
said retention clip central portion is received within said inlet plate groove and within said outlet plate groove.

6. A fluid pump as in claim 5, wherein:
said inlet plate groove intersects with said inlet plate slot; and
said outlet plate groove intersects with said outlet plate slot.

7. A fluid pump as in claim 1, wherein said retention clip central portion is located radially outward from said pumping element.

8. A fluid pump as in claim 1, wherein:
said retention clip first leg extends from said retention clip first end toward said axis; and
said retention clip second leg extends from said retention clip second end toward said axis.

9. A fluid pump as in claim 1, wherein said retention clip is a first retention clip, further comprising:
a second retention clip which includes a second retention clip central portion which extends from a second retention clip first end to a second retention clip second end, a second retention clip first leg which extends laterally from said second retention clip first end and which includes a first leg inner surface, and a second retention clip second leg which extends laterally from said second retention clip second end and which includes a second leg inner surface such that said first leg inner surface and said second leg inner surface face toward each other;
wherein said inlet plate includes a second inlet plate slot within which said second retention clip first leg is located and said outlet plate includes a second outlet plate slot within which said second retention clip second leg is located.

\* \* \* \* \*